(12) United States Patent
Sennett et al.

(10) Patent No.: US 9,571,295 B2
(45) Date of Patent: Feb. 14, 2017

(54) INITIATING A CALL TO AN EMERGENCY CALL CENTER VIA A RELAY SERVICE

(75) Inventors: DeWayne A. Sennett, Redmond, WA (US); Brian K. Daly, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 154 days.

(21) Appl. No.: 13/454,747

(22) Filed: Apr. 24, 2012

(65) Prior Publication Data
US 2013/0281046 A1    Oct. 24, 2013

(51) Int. Cl.
| | | |
|---|---|---|
| *H04M 11/04* | (2006.01) | |
| *H04L 12/18* | (2006.01) | |
| *H04W 4/22* | (2009.01) | |
| *H04L 29/08* | (2006.01) | |
| *H04W 76/00* | (2009.01) | |
| *H04W 12/06* | (2009.01) | |

(52) U.S. Cl.
CPC ....... *H04L 12/1895* (2013.01); *H04L 67/2823* (2013.01); *H04W 4/22* (2013.01); *H04W 76/007* (2013.01); *H04L 12/1822* (2013.01); *H04W 12/06* (2013.01)

(58) Field of Classification Search
CPC  H04M 11/04; H04M 2242/04; H04W 76/007; H04W 4/22; H04W 12/06; H04L 12/1895; H04L 67/2823; H04L 12/1822

USPC ............... 455/404.1, 404.2, 410, 411, 412.2, 414.1, 455/415, 416, 417, 466, 521
See application file for complete search history.

(56) References Cited

U.S. PATENT DOCUMENTS

| | | | |
|---|---|---|---|
| 8,868,028 B1 * | 10/2014 | Kaltsukis .............. | H04W 4/028 455/404.1 |
| 2004/0228464 A1 * | 11/2004 | Stevens .................... | 379/207.15 |
| 2007/0155412 A1 * | 7/2007 | Kaltsukis ...................... | 455/466 |
| 2009/0186596 A1 * | 7/2009 | Kaltsukis ................... | 455/404.2 |
| 2010/0220840 A1 * | 9/2010 | Ray et al. ....................... | 379/37 |

* cited by examiner

*Primary Examiner* — Thai Vu
(74) *Attorney, Agent, or Firm* — Baker & Hostetler LLP

(57) ABSTRACT

A call to an emergency call center from a device is initiated utilizing a relay service. The device may send a non-voice message to the relay service. The relay service, upon receipt and analysis of the message, may initiate a call to the device. The device, upon receiving the call and determining that the call is from the relay service, may place the call on hold and initiate a call to an emergency call center. Subsequently, the device may establish a multi-party call between the device, the relay service, and the emergency call center. Further, the relay service may maintain multiple communications modes in order to conduct non-voice messages with the device and conduct voice communications with the emergency call center.

16 Claims, 9 Drawing Sheets

INITIATING A CALL TO AN EMERGENCY CALL CENTER VIA A RELAY SERVICE

TECHNICAL FIELD

The technical field generally relates to public safety, and more specifically relates to initiating a call to an emergency call center, and even more specifically relates to initiating a call to an emergency call center via a relay center.

BACKGROUND

In an emergency situation, an individual can call 9-1-1 in order to obtain a quick response. The person can explain the emergency situation to the 9-1-1 call taker, and the 9-1-1 call taker can dispatch appropriate personnel to handle the emergency. This may be difficult, if not impossible, for a person with an impaired physical ability. For example, a person with a hearing impairment and/or speech impairment may not be able to speak to a 9-1-1 call taker to describe the emergency situation.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

A relay service is utilized to initiate a call to an emergency call center. In an example embodiment, a message is sent from a device to a relay service. The message may be in the form of a text message, a message comprising video, an instant messaging-like message, a Short Message Service (SMS) message, a Multimedia Messaging Service (MMS) message, a web chat, or the like. The relay service, upon receipt and analysis of the message, may initiate a call to the device from which the message was sent. The device, upon receiving the call and determining that the call is from the relay service, may place the call on hold and initiate a call to an emergency call center. Subsequently, the device may establish a multi-party call between the device, the relay service, and the emergency call center. The relay center may conduct message communications with the device and the relay center may conduct voice communications with the emergency call center.

Accordingly, a person with an impaired ability to initiate and/or conduct a call to an emergency call center, may utilize a relay service as described herein, to avoid delays in contacting an emergency call center. The mechanisms utilized by the device may be transparent to the person. Further, as described herein, the emergency call center and/or the relay center may be able to listen to and/or record audio from the device.

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

Figure 1:
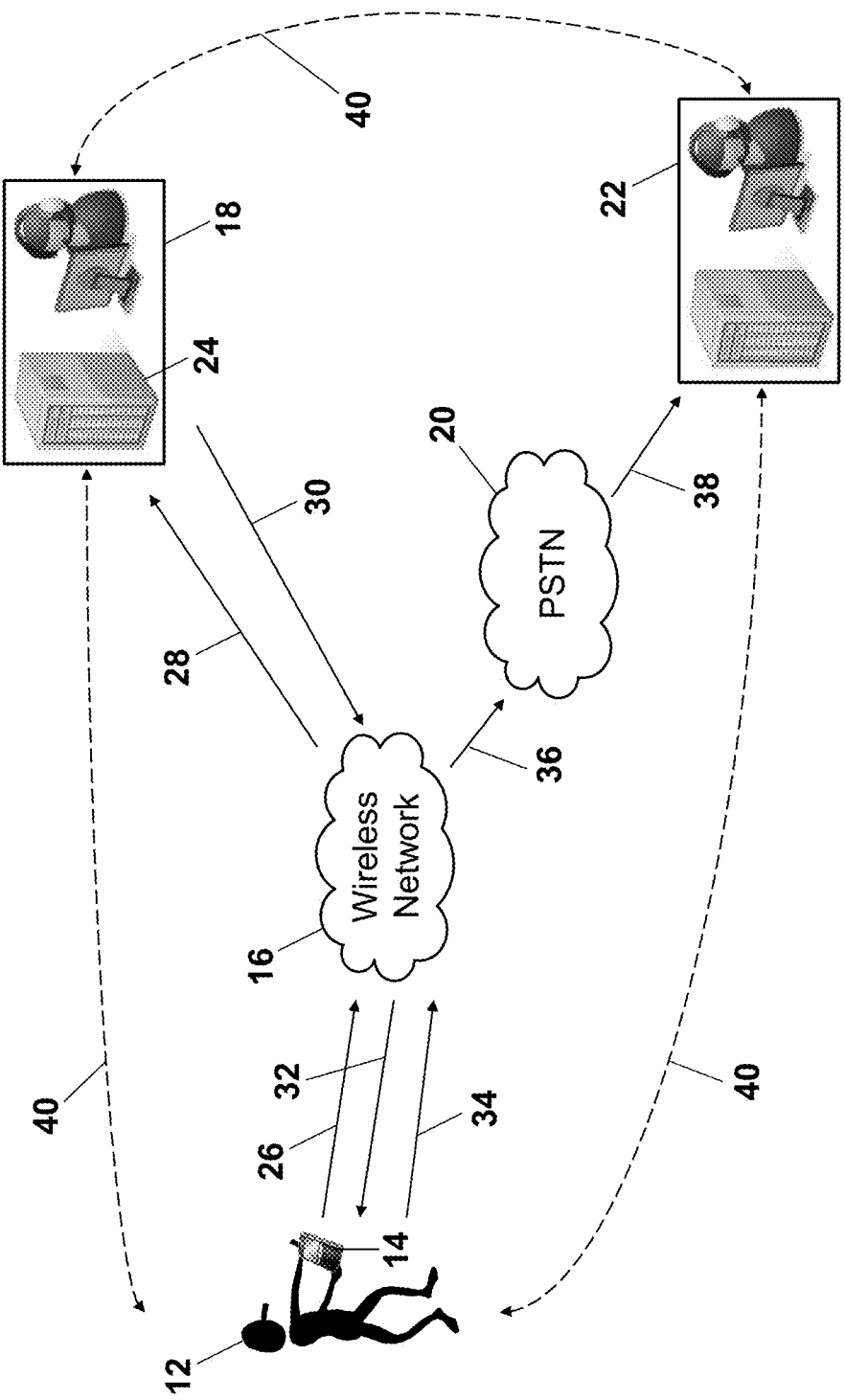
FIG. 1 illustrates an example system and process for initiating an emergency call.

FIG. 1 illustrates an example system and process for initiating an emergency call. As depicted in FIG. 1, a user (e.g., subscriber) 12, wants to make an emergency call to an emergency call center, for example (e.g., to 9-1-1). The user 12 can initiate a call via a communications device 14, to a relay service center 18, via a wireless network 16. The call can be in the form of any appropriate call. In an example embodiment, the call may be in the form of a text message, a message comprising video, an instant messaging-like message, a Short Message Service (SMS) message, a Multimedia Messaging Service (MMS) message, a web chat, or the like. The user 12 may start an application that has previously been installed on his/her communications device 14. The application can provide the user 12, via a user interface, or the like, on the communications device 14, the option to initiate a non-voice based (e.g., text based) session. In an example configuration, a text based session may automatically be initiated via preferences in the user's profile. The user 12 may compose a non-voice message utilizing SMS, IM, email, or the like, or a combination thereof. The user 12, via the communications device 14, may assign the message a special short code or telephone number that may be designated for non-voice to 911 emergency messages.

At steps 26 and 28, the communications device 14 may send the message to the relay center 18 via the wireless network 16 (e.g., radio access network or the like). The relay service center 18 may comprise a relay service center server 24. The relay service center server 24 may comprise any server, processor, computer, or the like, or any appropriate combination thereof. In various example embodiments, the relay service center server 24 may be configured to receive and/or send messages, analyze messages, provide an indication of a message to relay service personnel, or any appropriate combination thereof. Upon receipt and analysis of the message at the relay service center 18, it may be determined that an emergency condition exists. Examples of emergency conditions may include life threatening health condition (e.g., heart attack) being experienced by the subscriber, life threatening health condition occurring to another individual near the location of the subscriber (e.g., spouse, child, neighbor, friend), fire in the location of the subscriber, fire in the neighboring buildings of the subscriber's location, intruder in the subscriber's home, break-in observed at neighbor's home, automobile accident experienced by the subscriber, and automobile accident observed by the subscriber. The determination may be accomplished via the relay service center server 24, a relay service center person, or any appropriate combination thereof. The message may be analyzed in any appropriate manner to determine if an emergency condition exists. For example this may be determined from content in the body of the message, a header of the message, an identifier embedded in the message, a designated field of the message, video contained in the message, a graphic contained in the message, or the like, or any appropriate combination thereof.

Upon determining that that an emergency condition exists, the relay service center 18 calls the communications device 14 via the wireless network 16 (steps 30 and 32). The communications device 14, upon receiving the call (from steps 30 and 32) may determine that the call originated from the relay service center 18. This determination may be accomplished via any appropriate means. For example, the communications device 14 may interpret a caller ID mechanism to determine that the call originated from relay service center, the communications device 14 may interpret an indicator that was incorporated in the call by the relay service center 18 (e.g., indicator that the call is a 9-1-1 related call, etc.), or any appropriate combination thereof. In an example embodiment, in-band signaling may be accomplished via the use of DTMF tones. After a voice circuit has been established between the relay service center 18 and the subscriber's communications device 14, the relay service center server 24 would send to the communications device 14 the in-band signaling code (e.g., #911) via DTMF tones. The communications device 14 would be monitoring the established voice circuit for DTMF tones and would recognize the #911 in-band signaling code and would determine that this call is from the relay service center 18.

Upon determining that the call (from steps 30 and 32) is from a relay service center, the communications device 14 may place the relay service center on hold and initiate a call to an emergency call center. In an example embodiment, the call to an emergency call center may be a 9-1-1 call to emergency call center 22, at step 34, 36, and 38, via wireless network 16 and public switched telephone network 20. The emergency call center may comprise any appropriate emergency call center such as, for example, a PSAP, a fire department, a police station, a public safety office, or the like. The call to the emergency call center 22 can be initiated via any appropriate means for initiating a call to an emergency call center (e.g., 9-1-1 call, call to another number such as fire station, police department, etc., or the like). In an example embodiment, the call to the emergency call center 22 may be a 9-1-1 call that utilizes established mechanisms for location determination and PSAP routing. In the wireless network 16, there may be configuration information that associates every cell site with an appropriate Public Safety Answering Point (PSAP) including instructions on how to address and route calls to that specific PSAP. When an emergency call is initiated by the communications device 14, the wireless network 16 may be instructed, via call set-up signaling, that this is an emergency call. As part of the call set-up processing, the wireless network 16 may know which cell site is connected to the communications device 14 (commonly called the serving cell). Using the identity of the serving cell, the wireless network 16 may use its internal configuration information to determine the PSAP associated with the serving cell. Using the call routing instructions of the associated PSAP, the emergency voice call is established between the communications device 14 and the emergency call center 22 (also known as a PSAP).

When the call from the communications device 14 is answered by emergency call center 22, the communications device 14 may establish a multi-party call. In an example embodiment, the multi-party call may be between the relay service center 18 and the emergency call center 22. In another example embodiment, the multi-party call may be between the communications device 14, the relay service center 18, and the emergency call center 22, as depicted by dashed arrows 40. For example, the communications device 14 may establish a conference call between the communications device 14, the relay service center 18, and the emergency call center 22. The relay service center 18 may conduct voice communications with the emergency call center 22. Thus, even if the user 12 is unable to speak or hear, the call taker at the emergency call center 22 will be able receive background audio and/or video from the environment of the user 12. This background audio and/or video may provide information to the call taker at the emergency call center 22 to assess the urgency and severity of the emergency and to distinguish between actual emergency calls and prank calls. In an example embodiment, the relay service center 18 may maintain separate communications (separate from the multi-party call 40) in order to receive messages from the communications device 14 and provide messages to the communications device 14.

Figure 2:
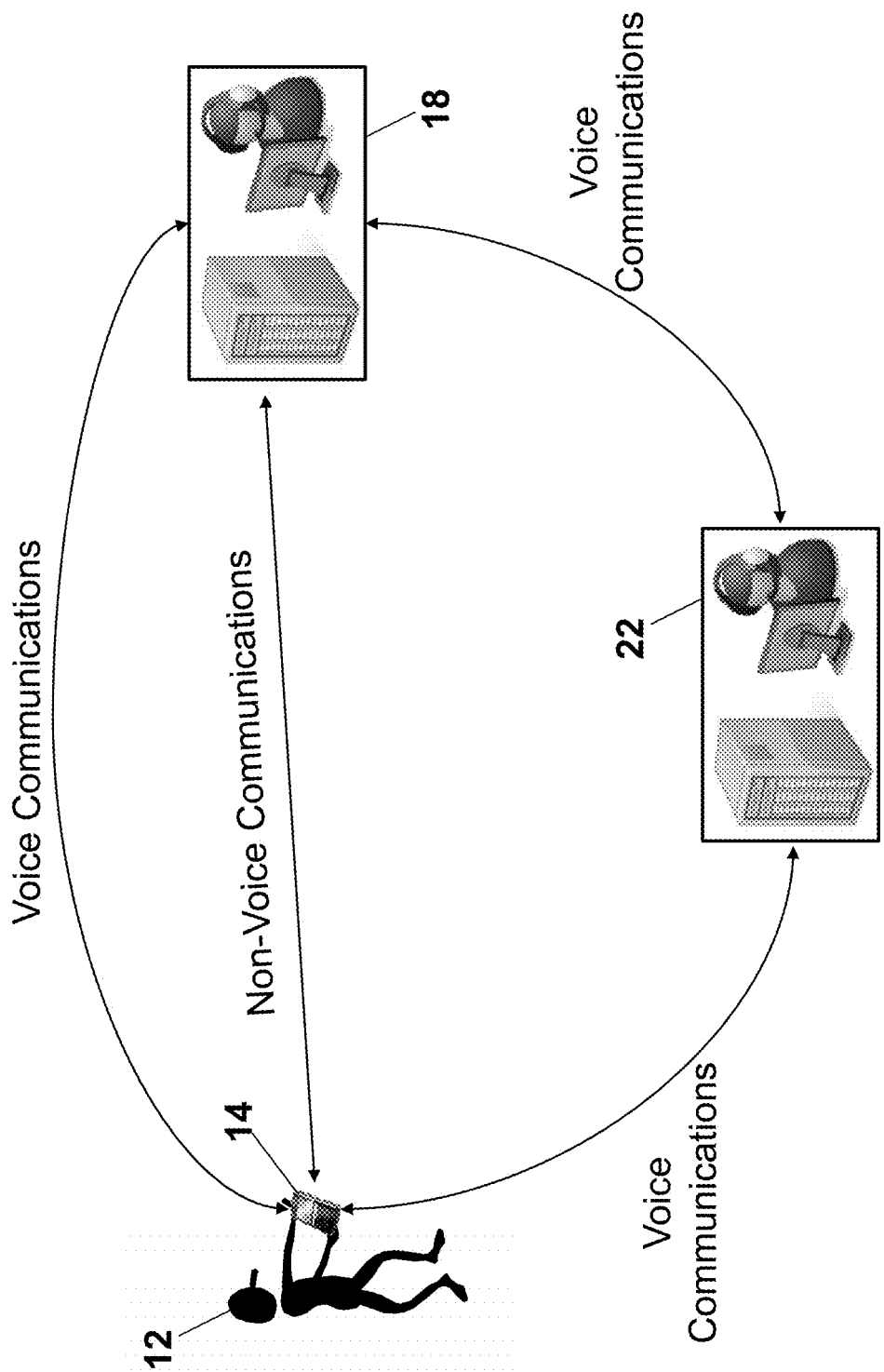
FIG. 2 illustrates another example system and process for initiating an emergency call.

Thus, the relay service center 18 may be in concurrent non-voice and voice communications as depicted in FIG. 2. That is, the relay service center 18 may be in concurrent non-voice communication with the communications device 14, and voice communication with the communications device 14 and the emergency call center 22. Accordingly, a call taker at the relay service center 18 may communicate with the user 12 via a first communications mode (e.g., non-voice communications) and relay the communications to a call taker at the emergency call center 22 via a second communications mode (e.g., voice communications). And the call taker at the relay service center 18 may communicate with a call taker at emergency call center 22 via the second communications mode (e.g., voice communications) and relay the communications to the user 12 via the first communications mode (e.g., non-voice communications).

As a result of the foregoing described process, delays in contacting emergency call centers (e.g., PSAPs) may be mitigated or eliminated. Emergency call centers may be able to record audio and/or video from the communications device. The recorded information may be utilized as needed (e.g., for use in trials, as evidence, etc.). Existing methodologies for location determination and PSAP routing may be utilized. And, the user 12 may use the communications device as he/she would normally use the commutations device to make a 9-1-1 call. The underlying process may be transparent to the user 12.

Figure 3:
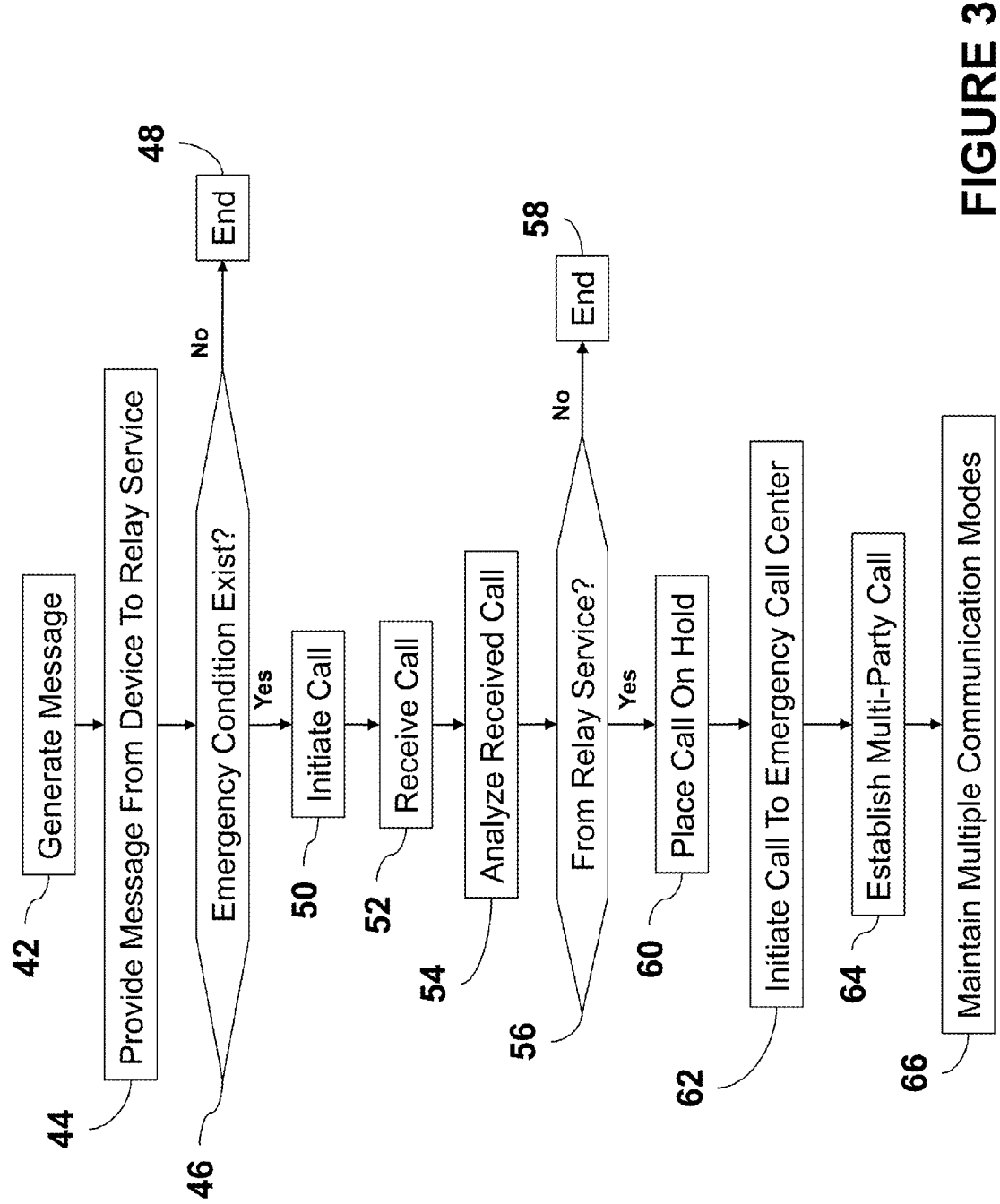
FIG. 3 is a flow diagram of an example process for initiating a call to an emergency call center via a relay center.

FIG. 3 is a flow diagram of an example process for initiating a call to an emergency call center via a relay center. A message is generated at step 42. The message may be generated by any appropriated device, such as, for example, a communications device, or the like. In an example embodiment, the message may be in the form of a text message, a video message, an instant messaging-like message, a Short Message Service (SMS) message, a Multimedia Messaging Service (MMS) message, web chat, or the like. In an example configuration, a text based session may automatically be initiated via preferences in a user's profile. The user may compose a non-voice message utilizing SMS, IM, email, or the like, or a combination thereof. The user may assign the message a special short code or telephone number that may be designated for non-voice to 9-1-1 emergency messages.

The message is provided to an intended recipient at step 44. In an example embodiment, the intended recipient is a relay service. The relay service may analyze the message to determine if an emergency condition exists at step 46. The determination may be accomplished in an appropriate manner, such as, for example from analyzing content in the body of the message, analyzing a header of the message, analyzing an identifier embedded in the message, analyzing a designated field of the message, analyzing video contained in the message, analyzing a graphic contained in the message, or the like, or any appropriate combination thereof. If it is determined that an emergency condition does not exist (at step 46), the process ends at step 48.

If it is determined that an emergency condition does exist (at step 46), a call is initiated by the relay service, at step 50. The call may be sent to the device that sent the message. The device may receive the call from the intended recipient (e.g., relay service) of the message at step 52. Thus, receipt of the call by the device is indicative of a determination (by the recipient of the message) that an emergency condition exists. The received call is analyzed, at step 54, to determine if it originated from the relay service. This determination may be accomplished via any appropriate means, such as, for example, a caller ID mechanism may be interpreted, an indicator that was incorporated in the call by the relay service (e.g., indicator that the call is a 9-1-1 related call, etc.) may be interpreted, or any appropriate combination thereof.

If it is determined, at step 56, that the call was not sent by the relay service, the process ends at step 58. If it is determined, at step 56, that the call was sent by the relay service, the call may be placed on hold, at step 60, by the device that received the call. A call to an emergency call center may be initiated at step 62. A multi-party call may be initiated at step 64. The multi-party call may be established between the device that sent the message (step 44), the relay service, and the emergency call center. For example, a conference call may be established between the device, the relay service, and the emergency call center.

In an example embodiment, multiple communication modes may be maintained at step 66. For example, the relay service may maintain separate communications (separate from the multi-party call) in order to receive messages from the device and provide messages to the device. Thus, the relay service may be in concurrent non-voice communication with the device and voice communication with the device and the emergency call center. Accordingly, a call taker at the relay service may communicate with a user of the device via a first communications mode (e.g., non-voice communications) and relay the communications to a call taker at the emergency call center via a second communications mode (e.g., voice communications). And the call taker at the relay service may communicate with a call taker at emergency call center via the second communications mode (e.g., voice communications) and relay the communications to the user via the first communications mode (e.g., non-voice communications).

Figure 4:
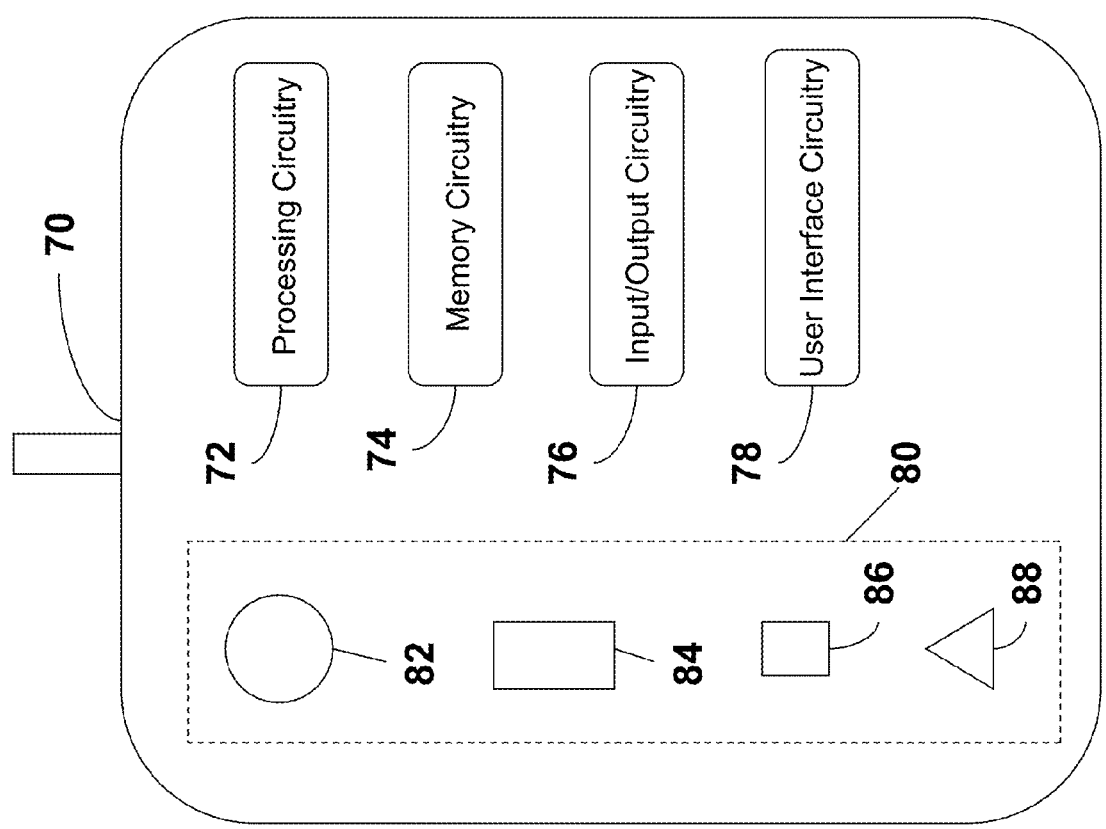
FIG. 4 is a block diagram of an example wireless communications device that is configurable to initiate a call to an emergency call center.

FIG. 4 is a block diagram of an example wireless communications device 70 that is configurable to initiate a call to an emergency call center. In an example embodiment, the communication device 70 may comprise the communications device 14 described herein. The communications device 70 may include any appropriate device, mechanism, software, and/or hardware for initiating a call to an emergency call center as described herein. As described herein, the communications device 70 may comprise hardware or a combination of hardware and software. In an example configuration, the communications device 70 may comprise processing circuitry 72, memory circuitry 74, input/output circuitry 76, user interface (UI) circuitry 78, and sensor circuitry 80 comprising at least one of a video camera portion 82, a force/wave sensor 84, a microphone 86, a moisture sensor 88, or a combination thereof. The force/wave sensor may comprise at least one of a motion detector, an accelerometer, an acoustic sensor, a tilt sensor, a pressure sensor, a temperature sensor, or the like. The motion detector may be configured to detect motion occurring outside of the communications device, for example via disturbance of a standing wave, via electromagnetic and/or acoustic energy, or the like. The accelerator may be capable of sensing acceleration, motion, and/or movement of the communications device. The acoustic sensor may be capable of sensing acoustic energy, such as a loud noise, for example. The tilt sensor may be capable of detecting a tilt of the communications device. The pressure sensor may be capable of sensing pressure against the communications device, such as from a shock wave caused by broken glass or the like. The temperature sensor may be capable of sensing a measuring temperature, such as inside of the vehicle, room, building, or the like. The moisture sensor 88 may be capable of detecting moisture, such as detecting if the communications device 70 is submerged in a liquid. The processing circuitry 72, memory circuitry 74, input/output circuitry 76, user interface (UI) circuitry 78, video camera portion 82, force/wave sensor 84, and microphone 86 may be coupled together to allow communications therebetween (coupling not shown in FIG. 4). The communications device may comprise a timer (not depicted in FIG. 4).

In various embodiments, the input/output circuitry 76 comprises a receiver of the communications device 70, a transmitter of the communications device 70, or a combination thereof. The input/output circuitry 76 is capable of receiving and/or providing information pertaining to initiating a call to an emergency call center as described herein. The input/output circuitry 76 also may be capable of communications with the wireless network 16, the relay service center 18, the relay service center server 24, and/or the emergency call center 22, as described herein. For example, the input/output circuitry 76 may include a wireless communications (e.g., 2.5G/3G/4G) SIM card. The input/output circuitry 76 may be capable of receiving and/or sending video information, audio information, control information, image information, data, or any combination thereof. In an example embodiment, the input/output circuitry 76 may be capable of receiving and/or sending information to determine a location of the communications device 70. In an example configuration, the input\output circuitry 76 may comprise a GPS receiver. In an example configuration, the communications device 70 may determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 76 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a WIFI finder, a two way GPS chipset or equivalent, or the like.

The processing circuitry 72 may be capable of facilitating initiation of a call to an emergency call center as described herein. For example, the processing circuitry 72 may be capable of, in conjunction with any other portion of the communications device 70, executing an application for initiating a call to an emergency call center, generating a non-voice message, generating a voice message, communication with a relay service center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing non-voice messages provided via the user interface circuitry 78, processing voice messages provided via the user interface portion 78, processing text messages received via the input/output circuitry 76, processing voice messages received via the input/output circuitry 76, determining if an emergency condition exists, analyzing a call to determine if the call originated from a relay service, placing a call on hold, establishing a multi-party call, or the like, or any combination thereof. The processing circuitry 72, in conjunction with any other portion of the communications device 70, may provide the ability for users/subscribers to enable, disable, and configure various features of an application for initiating a call to an emergency call center, as described herein. For example, a user, subscriber, parent, healthcare provider, law enforcement agent, of the like, can define configuration parameters such as, for example, an emergency contact list, voice/text/image/video options for an emergency call, threshold settings (e.g., timer settings, signature settings, etc.), to be utilized when sending and/or receiving a text/voice message to/from an emergency call taker/relay service. The processing circuitry 72, in conjunction with any other portion of the communications device 70, may enable the communications device 70 to covert speech to text when it is configured to send text messages. In an example embodiment, the processing circuitry 72, in conjunction with any other portion of the communications device 70, may be able to convert text to speech for rendering via the user interface circuitry 78.

In a basic configuration, the communications device 70 may include at least one memory circuitry 74. The memory circuitry 74 may be able store any information utilized in conjunction with initiating a call to an emergency call center as described herein. For example, the memory circuitry 74 may be capable of storing information pertaining to executing an application for initiating a call to an emergency call center, generating a non-voice message, generating a voice message, communication with a relay service center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing non-voice messages provided via the user interface circuitry 78, processing voice messages provided via the user interface portion 78, processing text messages received via the input/output circuitry 76, processing voice messages received via the input/output circuitry 76, determining if an emergency condition exists, analyzing a call to determine if the call originated from a relay service, placing a call on hold, establishing a multi-party call, or the like, or any appropriate combination thereof. Depending upon the exact configuration and type of processor, the memory circuitry 74 may be volatile (such as some types of RAM), non-volatile (such as ROM, flash memory, etc.). The communications device 70 may include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory circuitry 74, or a portion of the memory circuitry 72 may hardened such that information stored therein can be recovered if the communications device 70 is exposed to extreme heat, extreme vibration, extreme moisture, corrosive chemicals or gas, or the like. In an example configuration, the information stored in the hardened portion of the memory circuitry 74 may be encrypted, or otherwise rendered unintelligible without use of an appropriate cryptographic key, password, biometric (voiceprint, fingerprint, retinal image, facial image, or the like). Wherein, use of the appropriate cryptographic key, password, biometric may render the information stored in the hardened portion of the memory circuitry 74 intelligible.

The communications device 70 also may contain UI circuitry 78 allowing a user to communicate with the communications device 70. The UI circuitry 78 may be capable of rendering any information utilized in conjunction initiating a call to an emergency call center as described herein. For example, the UI circuitry 78 may contain circuitry for entering text, entering a phone number, rendering text, rendering images, rendering multimedia, rendering sound, rendering video, receiving sound, or the like, as described herein. The UI circuitry 78 may provide the ability to control the communications device 70, via, for example, buttons, soft keys, voice actuated controls, a touch screen, movement of the mobile communications device 70, visual cues (e.g., moving a hand in front of a camera on the mobile communications device 70), or the like. The UI circuitry 78 may provide visual information (e.g., via a display), audio information (e.g., via speaker), mechanically (e.g., via a vibrating mechanism), or a combination thereof. In various configurations, the UI circuitry 78 may comprise a display, a touch screen, a keyboard, a speaker, or any combination thereof. The UI circuitry 78 may comprise circuitry for inputting biometric information, such as, for example, fingerprint information, retinal information, voice information, and/or facial characteristic information. The UI circuitry 78 may be utilized to enter an indication of the designated destination (e.g., the phone number, IP address, or the like).

In an example embodiment, the sensor circuitry 80 of the communications device 70 may comprise the video camera portion 82, the force/wave sensor 84, and the microphone 86. The video camera portion 82 may comprise a camera (or cameras) and associated equipment capable of capturing still images and/or video and to provide the captured still images and/or video to other portions of the communications device 70. In an example embodiment, the force/wave sensor 84 may comprise an accelerometer, a tilt sensor, an acoustic sensor capable of sensing acoustic energy, an optical sensor (e.g., infrared), or any combination thereof.

Figure 5:
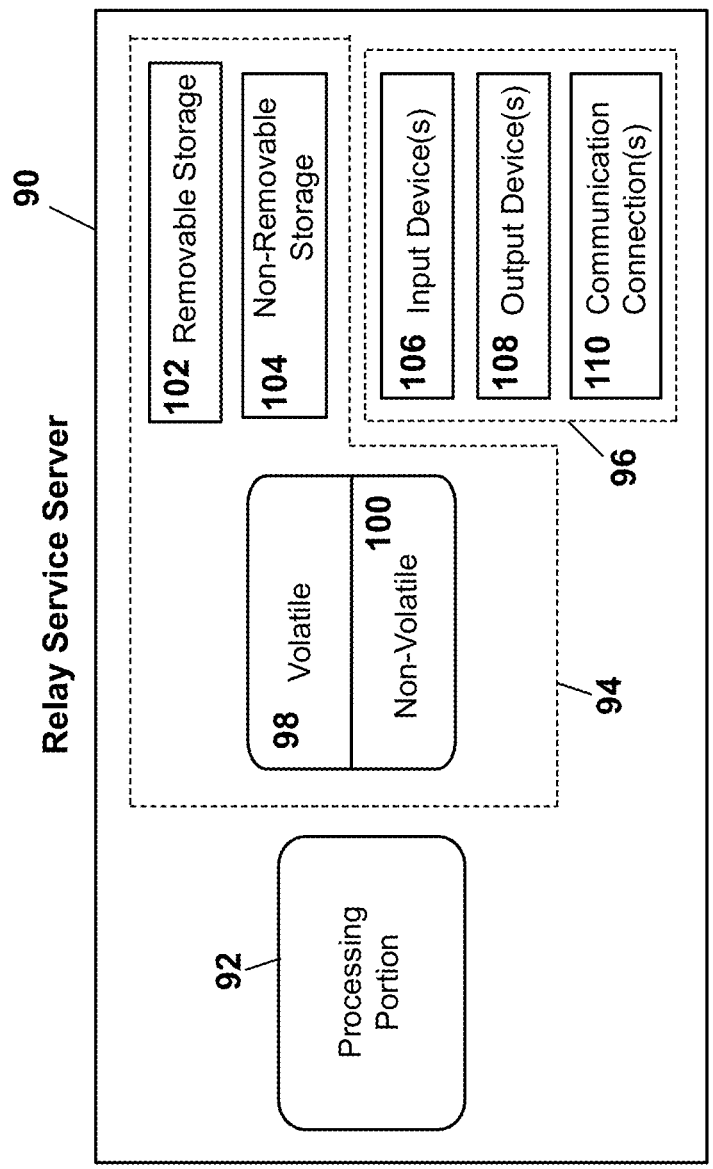
FIG. 5 is a block diagram of an example relay service server.

FIG. 5 is a block diagram of an example relay service server 90. In an example embodiment, the relay service server 90 may comprise the relay service center server 24 described herein. In an example embodiment, the relay service server 90 comprises hardware or a combination of hardware and software. The functionality needed to facilitate initiation of a call to an emergency call center may reside in any one or combination of relay service servers. The relay service server 90 depicted in FIG. 5 represents any appropriate entity, apparatus, or combination of entities or apparatuses, such as a processor, a server, a gateway, etc., or any combination thereof. It is emphasized that the block diagram depicted in FIG. 5 is exemplary and not intended to imply a specific implementation or configuration. Thus, the relay service server 90 may be implemented in a single processor or multiple processors (e.g., single server or multiple servers, single gateway or multiple gateways, etc.). Multiple servers may be distributed or centrally located. Multiple servers may communicate wirelessly, via hard wire, or a combination thereof.

In an example configuration, the relay service server 90 may comprise processing circuitry 92, memory circuitry 94, and input/output circuitry 96. The processing circuitry 92, memory circuitry 94, and input/output circuitry 96 are coupled together (coupling not shown in FIG. 5) to allow communications therebetween. The processing circuitry 92 may be capable of performing functions associated with facilitating initiation of a call to an emergency call center, as described herein. For example, the processing circuitry 92 may be capable of, in conjunction with any other portion of the relay service server 90, executing an application for facilitating initiation of a call to an emergency call center, generating a non-voice message, generating a voice message, communication via a text message and/or voice message, processing a received text message, processing a received voice message, processing a retrieved text message, processing a retrieved voice message, generating a predetermined message, retrieving a predetermined message, processing text messages received via the input/output circuitry 96, processing voice messages received via the input/output circuitry 96, determining if an emergency condition exists, or the like, or any combination thereof. The processing circuitry 92, in conjunction with any other portion of the relay service server 90, may provide the ability for users to enable, disable, and configure various features of an application for facilitating initiation of a call to an emergency call center, as described herein. The processing circuitry 92, in conjunction with any other portion of the communications device 90, may enable the relay service server 90 to covert speech to text when it is configured to send text messages. In an example embodiment, the processing circuitry 92, in conjunction with any other portion of the relay service server 90, may be able to convert text to speech.

The input/output circuitry 96 may capable of receiving and/or providing information from/to a device (e.g., communications device 14, communications device 70), other relay service servers, other relay services, and/or emergency call centers, when facilitating initiation of a call to an emergency call center, as described herein. The input/output circuitry 96 may be capable of communications with the wireless network 16, the another relay service center, another the relay service center server, the communications device 14, the communications device 70, and/or the emergency call center 22, as described herein. For example, the input/output circuitry 96 may include a wireless communications (e.g., 2.5G/3G/4G) SIM card. The input/output circuitry 96 may be capable of receiving and/or sending video information, audio information, control information, image information, data, or any combination thereof. In an example embodiment, the input/output circuitry 96 may be capable of receiving and/or sending information to determine a location of a communications device (e.g., communications device 14, communications device 70). In an example configuration, the input\output circuitry 96 may comprise a GPS receiver. In an example configuration, a geographical location may be determined through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 96 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a WIFI finder, a two way GPS chipset or equivalent, or the like.

The memory circuitry 94 may store any information utilized in conjunction with facilitating initiation of a call to an emergency call center, as described herein. For example, the memory circuitry 94 may be capable of storing information pertaining to executing an application for facilitating initiation of a call to an emergency call center, generating a non-voice message, generating a voice message, communication with a relay service center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing text messages received via the input/output circuitry 96, processing voice messages received via the input/output circuitry 96, determining if an emergency condition exists, analyzing a call, maintain multi-mode communications, or the like, as described herein, or any appropriate combination thereof.

Depending upon the exact configuration and type of relay service server 90, the memory circuitry 94 may include computer storage media that is volatile 98 (such as dynamic RAM), non-volatile 100 (such as ROM), or a combination thereof. The relay service server 90 may include additional storage, in the form of computer storage media (e.g., removable storage 102 and/or non-removable storage 104) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture and thus not a transient signal.

The relay service server 90 also may contain communications connection(s) 110 that allow the relay service server 90 to communicate with other devices, entities, servers, or the like. A communications connection(s) can comprise communication media. Communication media may be used to communicate computer readable instructions, data structures, program modules, or other data. Communication media can include an appropriate transport mechanism or information delivery media that may be used to transport a modulated data signal such as a carrier wave.

The relay service server 90 also may include input device(s) 106 such as keyboard, mouse, pen, voice input device, touch input device, etc. Output device(s) 108 such as a display, speakers, printer, etc. also can be included.

Communications devices (e.g., communications device 14, communications device 70) and servers (e.g., relay service center server 24, relay service server 90) may be part of and/or in communication with various wireless communications networks. Some of which are described below.

Figure 6:
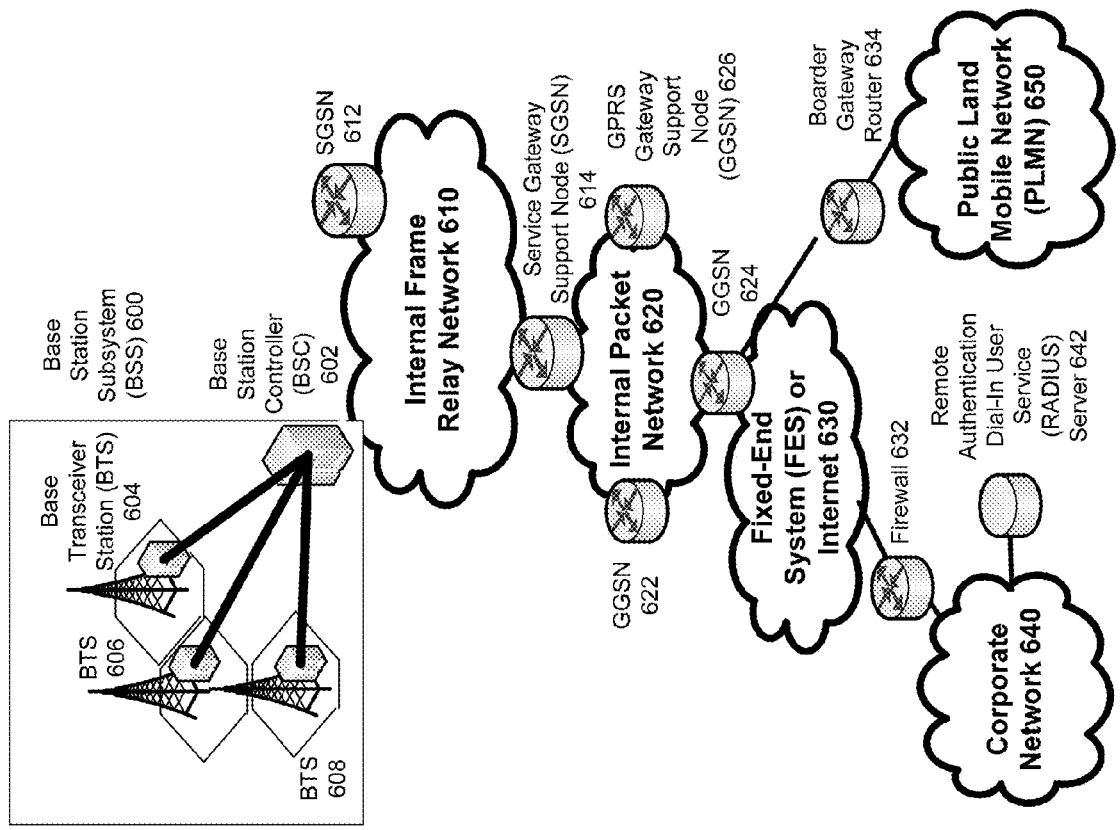
FIG. 6 depicts an overall block diagram of an exemplary packet-based mobile cellular network environment, such as a GPRS network, in which initiation of a call to an emergency call center may be implemented.

FIG. 6 depicts an overall block diagram of an exemplary packet-based mobile cellular network environment, such as a GPRS network, in which initiation of a call to an emergency call center may be implemented. In the exemplary packet-based mobile cellular network environment shown in FIG. 6, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 7:
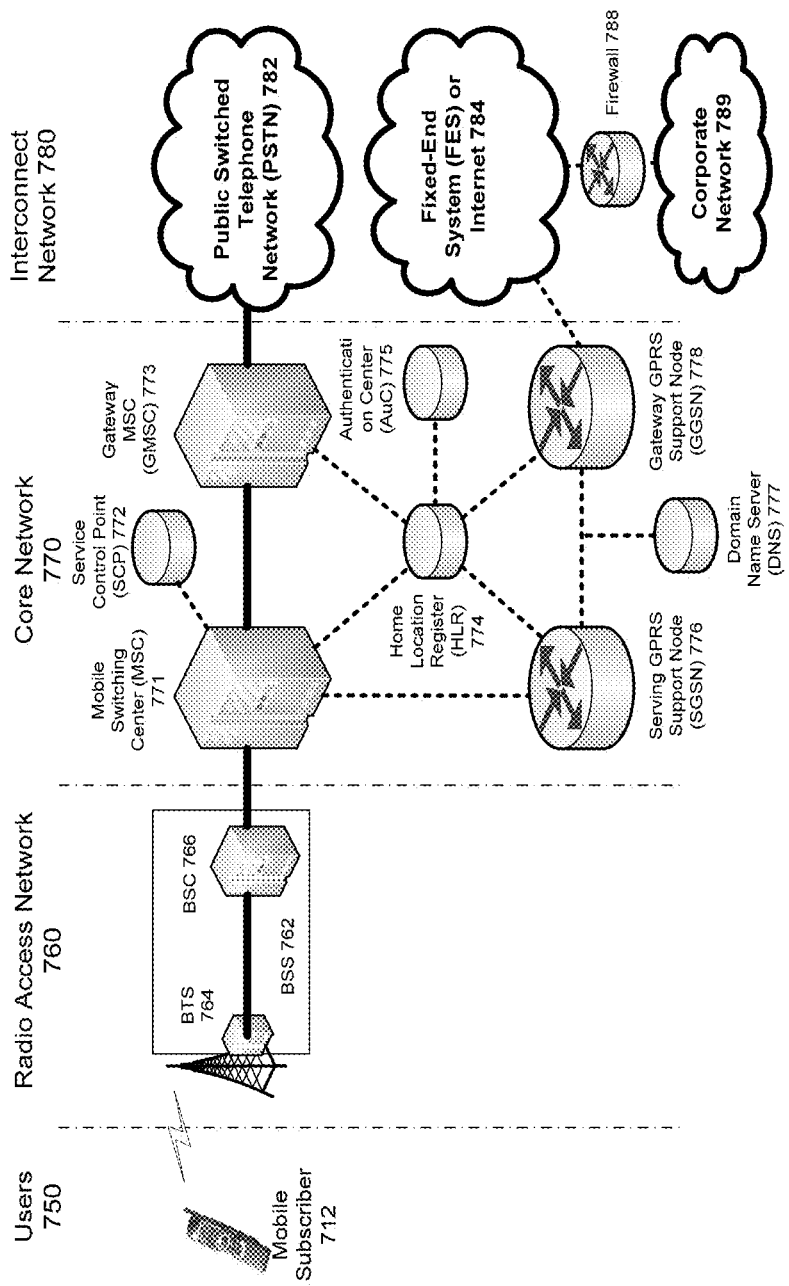
FIG. 7 illustrates an architecture of a typical GPRS network in which initiation of a call to an emergency call center may be implemented.

FIG. 7 illustrates an architecture of a typical GPRS network in which initiation of a call to an emergency call center may be implemented. The architecture depicted in FIG. 7 is segmented into four groups: users 750, radio access network 760, core network 770, and interconnect network 780. Users 750 comprise a plurality of end users. Note, device 712 is referred to as a mobile subscriber in the description of network shown in FIG. 7. In an example embodiment, the device depicted as mobile subscriber 712 comprises a communications device (e.g., communications device 14, communications device 70). Radio access network 760 comprises a plurality of base station subsystems such as BSSs 762, which include BTSs 764 and BSCs 766.

Core network 770 comprises a host of various network elements. As illustrated in FIG. 7, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 7, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 7, when mobile subscriber 712 initiates the attach process by turning on the network capabilities of the mobile device, an attach request is sent by mobile subscriber 712 to SGSN 776. The SGSN 776 queries another SGSN, to which mobile subscriber 712 was attached before, for the identity of mobile subscriber 712. Upon receiving the identity of mobile subscriber 712 from the other SGSN, SGSN 776 requests more information from mobile subscriber 712. This information is used to authenticate mobile subscriber 712 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 712 was attached before, to cancel the location process for mobile subscriber 712. HLR 774 then notifies SGSN 776 that the location update has been performed. At this time, SGSN 776 sends an Attach Accept message to mobile subscriber 712, which in turn sends an Attach Complete message to SGSN 776.

After attaching itself with the network, mobile subscriber 712 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 712. The mobile subscriber 712 uses an algorithm to send the user identification (ID) and password to SGSN 776. The SGSN 776 uses the same algorithm and compares the result. If a match occurs, SGSN 776 authenticates mobile subscriber 712.

Next, the mobile subscriber 712 establishes a user session with the destination network, corporate network 789, by going through a Packet Data Protocol ("PDP") activation process. Briefly, in the process, mobile subscriber 712 requests access to the Access Point Name ("APN"), for example, UPS.com, and SGSN 776 receives the activation request from mobile subscriber 712. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 712.

Once activated, data packets of the call made by mobile subscriber 712 can then go through radio access network 760, core network 770, and interconnect network 780, in a particular fixed-end system or Internet 784 and firewall 788, to reach corporate network 789.

Figure 8:
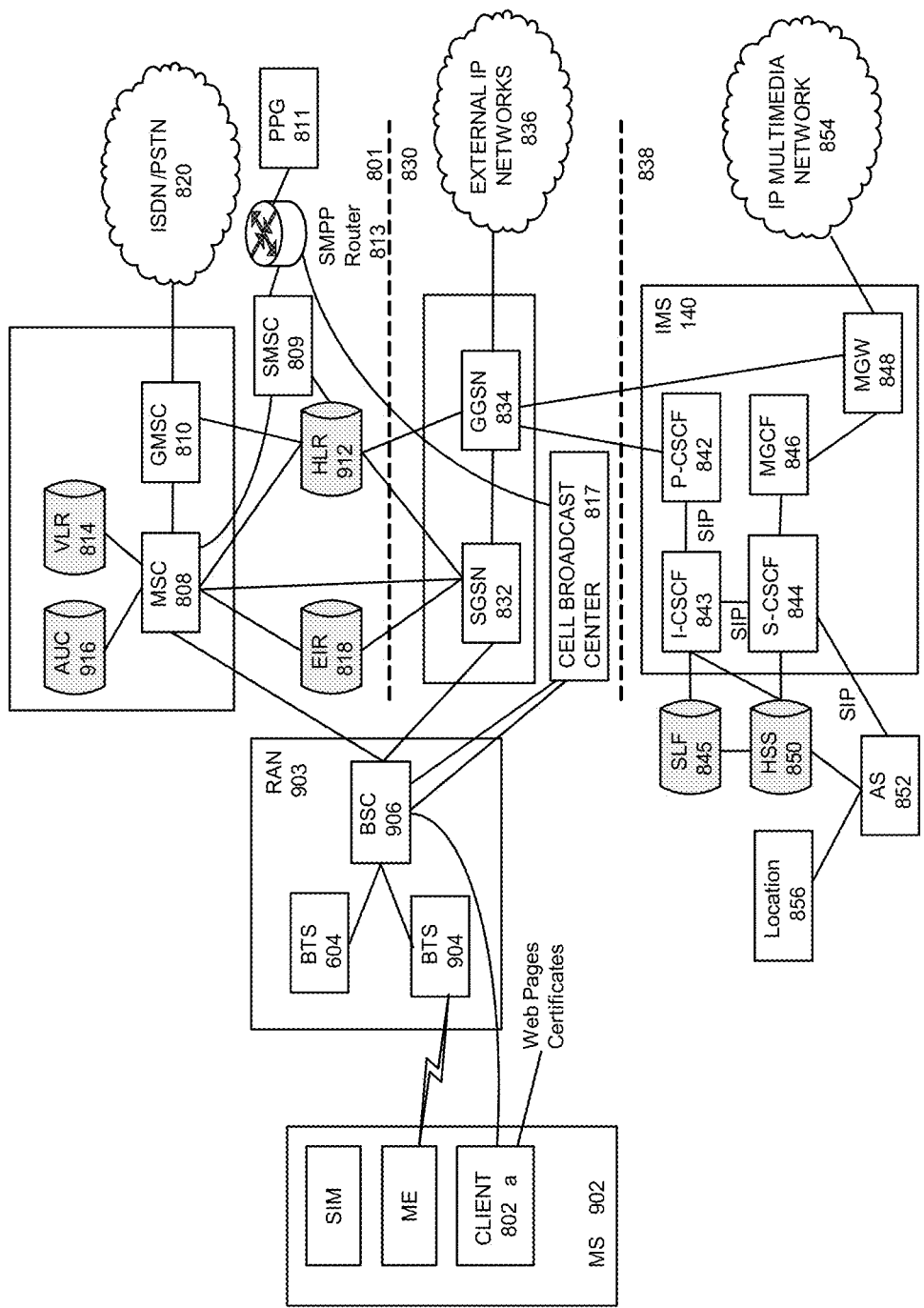
FIG. 8 illustrates an exemplary block diagram view of a GSM/GPRS/IP multimedia network architecture within which initiation of a call to an emergency call center may be implemented.

FIG. 8 illustrates an exemplary block diagram view of a GSM/GPRS/IP multimedia network architecture within which initiation of a call to an emergency call center may be implemented. As illustrated, the architecture of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 817 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 8, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 9:
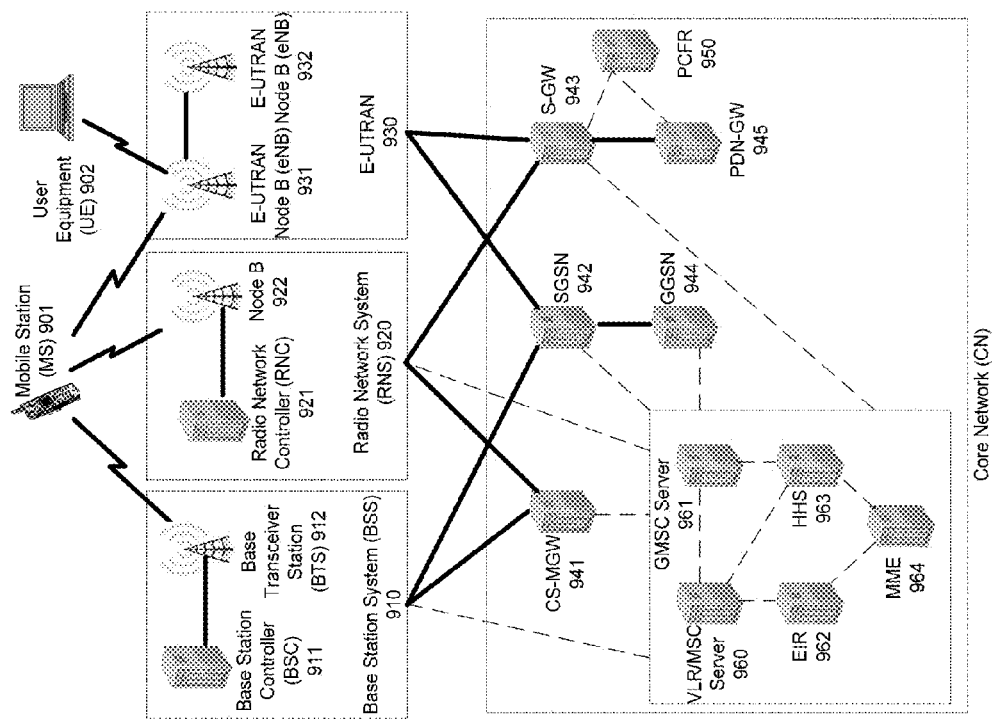
FIG. 9 illustrates a PLMN block diagram view of an exemplary architecture in which initiation of a call to an emergency call center may be incorporated.

FIG. 9 illustrates a PLMN block diagram view of an exemplary architecture in which initiation of a call to an emergency call center may be incorporated. Mobile Station (MS) 901 is the physical equipment used by the PLMN subscriber. In one illustrative embodiment, communications device 40 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

While example embodiments of initiating a call to an emergency call center have been described in connection with various computing devices/processors, the underlying concepts can be applied to any computing device, processor, and/or system capable of facilitating initiation of a call to an emergency call center as described herein. The methods and apparatuses for initiating a call to an emergency call center, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for facilitating initiation of a call to an emergency call center. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for initiating a call to an emergency call center may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating initiation of a call to an emergency call center. When implemented on a general-purpose processor, the program code combines with the processor to provide a unique apparatus that operates to invoke the functionality for initiating a call to an emergency call center.

While initiating a call to an emergency call center has been described in connection with the various embodiments of the various figures, it is to be understood that other similar embodiments can be used or modifications and additions can be made to the described embodiments for initiating a call to an emergency call center. For example, one skilled in the art will recognize that initiating a call to an emergency call center as described in the present application may apply to any environment, whether wired or wireless, and may be applied to any number of devices connected via a communications network and interacting across the network. Therefore, initiating a call to an emergency call center should not be limited to any single embodiment, but rather should be construed in breadth and scope in accordance with the appended claims.

What is claimed is:

1. A method comprising:
   establishing, non-voice communications between the user and a relay service by providing a message to a first device, the first device associated with the relay service;
   receiving, by a communications device of the user, a first call including an indicator indicating a determination that an emergency condition exists;
   placing, from the communications device, the first call on hold;
   initiating, from the communications device, a second call to a second device, the second device associated with an emergency call center; and
   establishing a multi-party call comprising voice communications between the user, the first device, and the emergency call center,
   wherein the non-voice communications between only the communications device and the first device are maintained concurrently with the voice communications.

2. The method of claim 1, wherein the determination that an emergency condition exists is determined by the relay service.

3. The method of claim 1, further comprising communicating with the emergency call center via the relay service.

4. The method of claim 1, wherein the message is a non-voice message.

5. The method of claim 1, wherein the voice communications comprise a one-way voice communication from the user to the emergency call center.

6. The method of claim 1, wherein the voice communications comprise a two-way voice communication between the user and the emergency call center.

7. A device comprising:
   a processor; and
   memory coupled to the processor, the memory comprising executable instructions that cause the processor to effectuate operations comprising:
   establishing non-voice communications between a user of the device and a relay service by providing a message from the user to a first device, the first device associated with the relay service;
   receiving a first call an indicator indicating a determination that an emergency condition exists;
   placing the first call on hold;
   initiating a second call to a second device, the second device associated with an emergency call center; and
   establishing a multi-party call comprising voice communications between the user, the first device, and the emergency call center,
   wherein the non-voice communications with only the first device is maintained concurrently with the voice communications.

8. The device of claim 7, wherein the determination that an emergency condition exists is determined by the relay service.

9. The device of claim 7, the operations further comprising communicating with the emergency call center via the relay service.

10. The device of claim 7, wherein the message is a non-voice message.

11. The device of claim 7, wherein the voice communications comprise a one-way voice communication from the user to the emergency call center.

12. The device of claim 7, wherein the voice communications a two-way voice communication between the user and the emergency call center.

13. The device of claim 7, wherein the device comprises a mobile communications device.

14. A computer-readable storage medium comprising executable instructions that cause a processor of a communications device executing the executable instructions to effectuate operations comprising:
   establishing non-voice communications between a user using a communications device and a relay service by providing a message from the communications device to a first device, the first device associated with the relay service;
receiving a first call at the communications device, the first call including an indicator indicating a determination that an emergency condition exists;
placing the first call on hold;
initiating a second call to a second device, the second device associated with an emergency call center; and
establishing a multi-party call comprising voice communications between the user, the first device, and the emergency call center,
wherein the non-voice communications between only the communications device and the first device are maintained concurrently with the voice communications.

15. The computer-readable storage medium of claim 14, the operations further comprising communicating with the emergency call center via the relay service.

16. The computer-readable storage medium of claim 14, wherein the voice communications comprise a one-way voice communication from the user to the emergency call center.

\* \* \* \* \*